(No Model.)

M. H. MOLLOY.
CAR BRAKE.

No. 469,423. Patented Feb. 23, 1892.

Witnesses.

Inventor.
Michael Henry Molloy
By C. N. Benedict
Attorney.

UNITED STATES PATENT OFFICE.

MICHAEL HENRY MOLLOY, OF MILWAUKEE, WISCONSIN.

CAR-BRAKE.

SPECIFICATION forming part of Letters Patent No. 469,423, dated February 23, 1892.

Application filed May 11, 1891. Serial No. 392,277. (No model.)

*To all whom it may concern:*

Be it known that I, MICHAEL HENRY MOLLOY, of Milwaukee, in the county of Milwaukee and State of Wisconsin, have invented a new and useful Improvement in Car-Brakes, of which the following is a description, reference being had to the accompanying drawings, which are a part of this specification.

My invention relates to a car-brake particularly adapted for use on street-railway cars, especially such as are operated by cable or by electricity, but may be used on any car.

Figure 1:
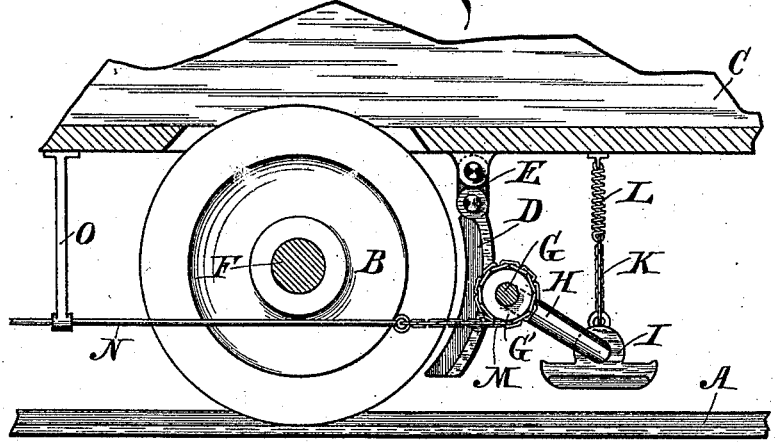
Figure 2:
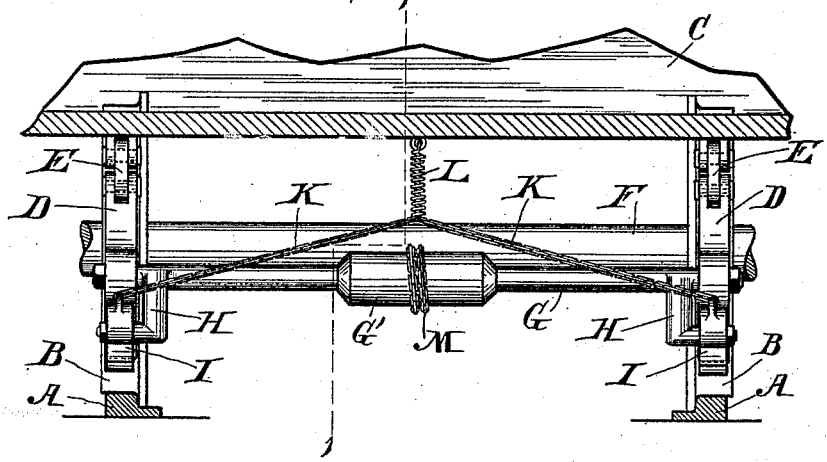

In the drawings, Figure 1 is a fragment of a car with my improved brake attached thereto, the view being in section on line 1 1 of Fig. 2. Fig. 2 is a fragment of a railway-car, partly in section, with my improved brake attached thereto, the view being at right angles to the view shown in Fig. 1.

A A are railway-rails forming the track on which the wheels B of the car C are adapted to travel.

The brakes D are pivoted and suspended from the car, preferably, by means of links E. The brakes are located at the rear of the edges of the wheels and are suitably shaped and arranged to bear against and check the movement of the rotating wheels. These brakes are arranged in pairs opposite to each other in the rear of the two car-wheels on the same axle F. A rod G is journaled near its respective ends in the two brakes of each pair, and the rod is provided with radially-projecting arms H, on the outer ends of which auxiliary brakes I are pivoted, these auxiliary brakes being located directly above the rails A. The auxiliary brakes I are normally supported yieldingly at a little distance from the track, advisably by means of chains K K and a spring L. The brakes D also, normally, are by gravity or equivalent means held at a little distance from the wheels B.

Suitable means are used for forcing the brakes D against the wheels B and at the same time throwing the auxiliary brakes I against the track A. This means may, and advisedly does, consist of a chain M, secured to and wound upon an enlarged part G' of the rod G, and connected at its other end to a brake-rod N, supported and having endwise movement in brackets O, affixed to the car. Near the front end of the car the rod N is provided with a chain, which winds about a vertical revoluble hand-rod or brake-post supported in the platform of the car in such manner as is in common use and is well known for that purpose, the chain being arranged to wind on the post and thereby to move the rod endwise and draw the brakes D against the wheels and throw the auxiliary brakes I down on the track.

Similar brakes and auxiliary brakes are to be arranged on the other side of the wheel, so that when the car runs in the other direction such brakes and auxiliary brakes may be applied to the wheels on the other or then rear side of the wheels.

What I claim as new, and desire to secure by Letters Patent, is—

1. In a car, the combination, with brakes pivoted thereto and arranged to be forced into engagement with the car-wheels, of arms hinged on the brakes, auxiliary brakes carried on the arms, a spring interposed between the car and the auxiliary brakes, supporting them yieldingly above the track, and suitable means for forcing the brakes into engagement with the wheels and the auxiliary brakes down upon the track, substantially as described.

2. In a car, the combination, with swinging brakes pivoted on the car and arranged to be thrown against the wheels, of arms rigid on a rod pivoted in the brakes, spring-supported auxiliary brakes carried on the ends of the arms, and a power-actuated brake-chain M, secured to and winding on the brake-connecting and auxiliary brake-supporting rod, substantially as described.

In testimony whereof I affix my signature in presence of two witnesses.

MICHAEL HENRY MOLLOY.

Witnesses:
C. T. BENEDICT,
ANNA V. FAUST.